(12) United States Patent
Püttmann

(10) Patent No.: US 8,235,148 B2
(45) Date of Patent: Aug. 7, 2012

(54) THREAD RETENTION FOR AN EARTH BORING DEVICE

(75) Inventor: Franz-Josef Püttmann, Lennestadt (DE)

(73) Assignee: Tracto-Technik GmbH, Lennestadt (DE)

( * ) Notice: Subject to any disclaimer, the term of this patent is extended or adjusted under 35 U.S.C. 154(b) by 0 days.

(21) Appl. No.: 13/014,335

(22) Filed: Jan. 26, 2011

(65) Prior Publication Data

US 2011/0123292 A1 May 26, 2011

Related U.S. Application Data

(63) Continuation of application No. 12/093,390, filed as application No. PCT/EP2006/010859 on Nov. 13, 2006, now Pat. No. 7,954,565.

(30) Foreign Application Priority Data

Nov. 11, 2005 (DE) .......................... 10 2005 054 311
Jun. 23, 2006 (DE) .......................... 10 2006 029 346

(51) Int. Cl.
*E21B 17/02* (2006.01)
*E21B 17/04* (2006.01)
*E21B 17/042* (2006.01)
(52) U.S. Cl. .................... 175/320; 175/325.6
(58) Field of Classification Search .................. 175/293, 175/320, 57, 325.6; 166/242.6; 411/271, 411/325

See application file for complete search history.

(56) References Cited

U.S. PATENT DOCUMENTS

| 1,817,591 | A | | 8/1931 | Slatcher |
| 1,871,728 | A | | 8/1932 | Nell |
| 2,182,903 | A | | 12/1939 | Phipps |
| 2,550,511 | A | | 4/1951 | Williams |
| 2,862,286 | A | | 12/1958 | Williams |
| 2,935,327 | A | | 5/1960 | Lear |
| 3,419,928 | A | | 1/1969 | Gabbey |
| 4,199,035 | A | | 4/1980 | Thompson |
| 4,993,888 | A | * | 2/1991 | Briese .............................. 407/11 |
| 5,244,323 | A | | 9/1993 | Tucchio |
| 5,344,252 | A | | 9/1994 | Kakimoto |
| 6,464,023 | B2 | | 10/2002 | Patterson |
| 7,165,924 | B1 | | 1/2007 | Breslin et al. |
| 2004/0057810 | A1 | | 3/2004 | Breslin et al. |

FOREIGN PATENT DOCUMENTS

| CH | 346785 | 7/1960 |
| CN | 2050500 U | 1/1990 |
| DE | 878 125 | 6/1953 |
| DE | 26 31 743 C2 | 3/1977 |
| DE | 197 18 897 A1 | 11/1998 |
| DE | 102 01 225 A1 | 8/2003 |
| DE | 103 59 880 A1 | 7/2005 |

* cited by examiner

*Primary Examiner* — Brad Harcourt
(74) *Attorney, Agent, or Firm* — Henry M. Feiereisen; Ursula B. Day

(57) ABSTRACT

A threaded element for connection with a housing of an earth boring device includes a body having an inner bore and a slot. The slot extends inwardly from a perimeter of the body and terminates in the inner bore of the body. The body of the threaded element has a receptacle in the area of the slot for insertion of a locking bolt, with the body having an outer diameter which undergoes an enlargement, as the locking bolt is inserted in the receptacle. The body has an outer thread for threaded connection with a housing.

3 Claims, 6 Drawing Sheets

THREAD RETENTION FOR AN EARTH BORING DEVICE

CROSS-REFERENCES TO RELATED APPLICATIONS

This application is a continuation of prior filed copending U.S. application Ser. No. 12/093,390, filed May 12, 2008, the priority of which is hereby claimed under 35 U.S.C. §120 and which is the National Stage of International Application No. PCT/EP2006/010859, filed Nov. 13, 2006, which designated the United States and has been published as International Publication No. WO 2007/054353 and claims the priority of German Patent Applications, Serial No. 10 2005 054 311.1, filed Nov. 11, 2005, and 10 2006 029 346.0, filed Jun. 23, 2006, pursuant to 35 U.S.C. 119(a)-(d).

BACKGROUND OF THE INVENTION

The invention relates to an earth boring device and a threaded element with a thread retention for an earth boring device.

Earth boring devices, in particular in the field of trenchless installation and rehabilitation of lines and pipes, are known in many forms.

One type of earth boring devices involves so-called soil displacement hammers, which are characterized by an internal percussion drive having a percussion piston which oscillates, i.e. strikes alternately, inside a housing of the soil displacement hammer and is operated by a pressure fluid and which impacts—depending on the feed direction of the soil displacement hammer—a leading or trailing impact surface of the housing or an attached structure and thereby transfers its kinetic energy onto the earth boring device for propelling the latter into the earth.

The impact surfaces of the percussion piston as well as of the housing must evidently withstand very high stress. Therefore, the impact surfaces of the percussion piston and the housing are hardened. Furthermore, it may be provided to integrate at least the leading impact surface of the housing in a structure which is replaceable, when worn out. In this way, maintenance costs of the soil displacement hammer can be limited. Such a replaceable structure thus assumes the task of transferring the impact energy from the percussion piston to the housing. As a result, the connection thereof with the housing has to meet stringent requirements.

Conventionally, such replaceable structures having an impact surface are normally connected to the housing through intervention of a thread, wherein the threaded connection is oftentimes further secured by means of a thread retention adhesive. This prior art solution suffers shortcomings in operation. Firstly, hardening of the thread retention adhesive requires a wanted time period during which the soil displacement hammer cannot be operated for safety reasons. Such a delay causes added operating costs in particular when the percussion structure is replaced during a drilling need. Moreover, detachment of a percussion structure that has been secured by a thread retention adhesive is very difficult.

SUMMARY OF THE INVENTION

The invention is thus based on the object to provide an earth boring device which at least reduces prior art shortcomings. In particular, it is desired to provide a soil displacement hammer which includes a structure with impact surface, which structure can easily be assembled and disassembled while yet ensuring a secure hold.

According to one aspect of the present invention, the object is attained by an earth boring device which includes a housing having at least one portion with an inner thread, and a threaded element having a corresponding outer thread, wherein the threaded element is slotted and has a receptacle for a securing element which increases the outer diameter of the threaded element and the contact pressure of the threaded connection between threaded element and housing, when inserted in the receptacle.

According to another aspect of the present invention, a threaded element for connection with the housing of an earth boring device is provided which is slotted and has a receptacle for a locking bolt in the area of the slot, wherein the outer diameter of the threaded element undergoes an enlargement, as the locking bolt is inserted.

According to another aspect of the present invention, a method of fastening a slotted threaded element in the housing of an earth boring device, includes the steps of screwing the threaded element with its outer thread into a corresponding thread of the housing, and inserting a locking bolt in a receptacle arranged in the area of the slot for enlarging the outer diameter of the threaded element and the contact pressure of the threaded connection.

According to another aspect of the present invention, a threaded ring with an outer thread is provided which is slotted at least at one area in length direction, and a receptacle is provided in the area of the slot for accepting a locking bolt, wherein the outer diameter of the threaded ring is enlarged, as the locking bolt is inserted.

According to another aspect of the present invention, a method of securing a threaded connection between a longitudinally slotted threaded ring with an outer thread and a corresponding inner thread includes the steps of inserting a locking bolt in an off-center receptacle within the threaded ring so that the outer diameter of the threaded ring is enlarged.

The essence of the invention is the connection of a threaded element, which is slotted at least in one area and preferably provided directly or indirectly for transmission of the impact energy from a percussion piston of the earth boring device onto the housing, to a housing via a thread, and the securement of this thread connection by a locking bolt which is inserted into a receptacle provided in the area of the slot of the threaded element to thereby effect an enlargement of the outer diameter of the threaded element. The enlargement of the outer diameter increases the contact pressure of the threaded connection so that an unwanted detachment can be prevented.

The term "threaded element" is to be understood as relating to a structure having at least one portion of circular cross section, with an outer thread being additionally provided in this portion.

The slot in the threaded element should be configured such that it can be spread as the locking bolt is inserted. The locking bolt extends preferably in the direction of the length axis of the threaded element, although it is equally possible to orient the slot at an angle of up to <90° in relation to the length axis of the threaded element. Furthermore, the slot extends preferably over the entire portion of the threaded element that is provided with a thread. As far as the depth of the slot is concerned, it is preferably provided to run the slot from the perimeter of the threaded element up to the length axis of the threaded element or to have it terminate in an inner bore (in a threaded element in the form of a threaded ring). The slot may hereby extend radially or inclined.

The receptacle preferably includes for the locking bolt a portion which tapers, i.e. the cross section decreases steadily in this portion. Preferably, the portion of the receptacle tapers conically. Such a (conical) taper of the receptacle causes together with a locking bolt, which is pushed into the receptacle, a widening of the slot of the threaded element and thus an enlargement of its outer diameter.

In addition, or as an alternative, the locking bolt has a—preferably conically—tapered portion by which the slot is widened, when the locking bolt is inserted.

According to an advantageous configuration, the locking bolt has a portion with an outer thread which corresponds to a portion of the receptacle with an internal thread. The locking bolt can thus be screwed into the receptacle.

The earth boring device is preferably configured as striking boring device (soil displacement hammer), i.e. it has an internal percussion drive with an oscillating, i.e. reciprocating percussion piston. The latter is preferably operated by a pressure fluid, preferably compressed air and/or hydraulic fluid which can be supplied from outside to the boring device. Such a configuration of the earth boring device enables the threaded element to directly or indirectly transmit the impact energy onto the housing of the boring device.

According to a further advantageous configuration, the treaded element is constructed as threaded ring. A percussion bolt may be movably guided at least in longitudinal axial direction within the threaded ring. In this case, it may be provided to arrange the receptacle for the locking bolt off-center, i.e. in the marginal area of the threaded ring. The percussion bolt may extend through the threaded ring beyond the housing of the boring device and connected there with a drill head so that the drill head itself is arranged for movement in relation to the housing of the boring device.

In such a configuration of the boring device, the percussion piston is able to impact the percussion bolt in one operative state, for example when the boring device is moved forward, wherein the percussion bolt moves then initially in relation to the housing and displaces hereby with the drill head soil located anteriorly of the boring device. In a second propulsion stage, the remaining impact energy can then be transmitted via the percussion bolt or the percussion piston directly or indirectly onto the threaded ring in order to push forward the housing in the borehole which has been established by the drill head. In this way, a multistage transmission of the impact energy can be realized which positively affects the attainable advance speed. Besides the mentioned two-stage transmission, any number of propulsion stages may be provided, wherein the last (in time) stage normally involves the transmission of the impact energy via the threaded ring onto the housing.

A threaded element according to the invention may, advantageously, also be installed in existing boring devices. It is thus, i.e., also possible to facilitate the assembly of new boring devices as well as the maintenance of already existing boring device, when using the threaded element according to the invention.

By using the threaded element according to the invention, it can be easily screwed, in part even by hand, into the housing of the boring device. Then, the locking bolt is placed in the receptacle of the threaded element, thereby increasing the contact pressure of the threaded connection and preventing an unwanted detachment. The boring device can thus be used directly, without waiting for a hardening, as required in adhering thread retainers for example.

The threaded element represents a wearing part and can be replaced by simply removing the locking bolt to thereby reduce the contact pressure again in the threaded connection. The threaded element can then be unscrewed, in part by hand, from the housing without significant force application, According to a preferred embodiment, the securing element is made of several parts. It is especially preferred, when the locking bolt has a sleeve, which is placed in the receptacle of the threaded element, and a bolt. Especially preferred is the placement of the bolt, at least in part, in the sleeve.

According to a preferred embodiment, the receptacle extends through the threaded element and has an opening on one side of the threaded element and an opening on an opposite side of the threaded element. It is preferred to insert the sleeve from one side in the receptacle and to insert the bolt from the other side of the receptacle, in particular in such a way that the bolt engages, at least in part, the sleeve, for example with an outer thread that engages an inner thread of the sleeve.

According to a preferred embodiment, the bolt, which is inserted in the sleeve at least in part, has an anti-rotation mechanism by which the bolt can be restrained against rotating in the receptacle. The bolt may, for example, have a protrusion which engages a corresponding recess of the threaded element.

According to a preferred embodiment, the bolt has a conical configuration. In addition, or as an alternative, the sleeve may have a conical configuration.

According to a preferred embodiment, the receptacle has a guide portion for receiving a sleeve constructed as a block. The sleeve is guided in the guide portion by two opposing guide surfaces for movement along these guide surfaces. The guide surfaces converge in direction of the spreading movement of the sleeve. It is especially preferred, when the block, except for contacting the guide surfaces and the engagement with the bolt, is free from any contact with other elements.

The block may have grooves for engagement of the portions of the receptacle that form the guide surfaces.

According to a preferred embodiment, the locking bolt has an outer thread which engages an inner thread of the block. The bolt may have a head for abutment against a portion of the threaded element. The head and/or the pertaining portion of the threaded element may have a conical configuration. As a result, the head can contribute to the spreading effect.

According to a preferred embodiment, the slot of the threaded element traverses the threaded element in direction of its length axis and in radial direction and traverses also the receptacle. A threaded element in which the slot of the threaded element fully traverses in length direction from a first end to a second end, it is of advantage to provide spreading means on the first end as well as on the second end. As a result, the threaded element can be evenly expanded over its length direction. As an alternative, it is, of course, also possible that only one end undergoes an expansion. This reduces the number of components. The even expansion is attained for example by the afore-described embodiments in which the securing element is made of several parts and a bolt is inserted from the one end into the receptacle and engages a sleeve which is inserted from the other end of the receptacle.

In addition to the application for boring devices, the threaded element according to the invention may be used in all fields that seek an effective and detachable thread retention.

BRIEF DESCRIPTION OF THE DRAWING

An exemplary embodiment of the invention will now be described in greater detail with reference to the drawings.

The drawings show in

DETAILED DESCRIPTION OF PREFERRED EMBODIMENTS

Figure 1:
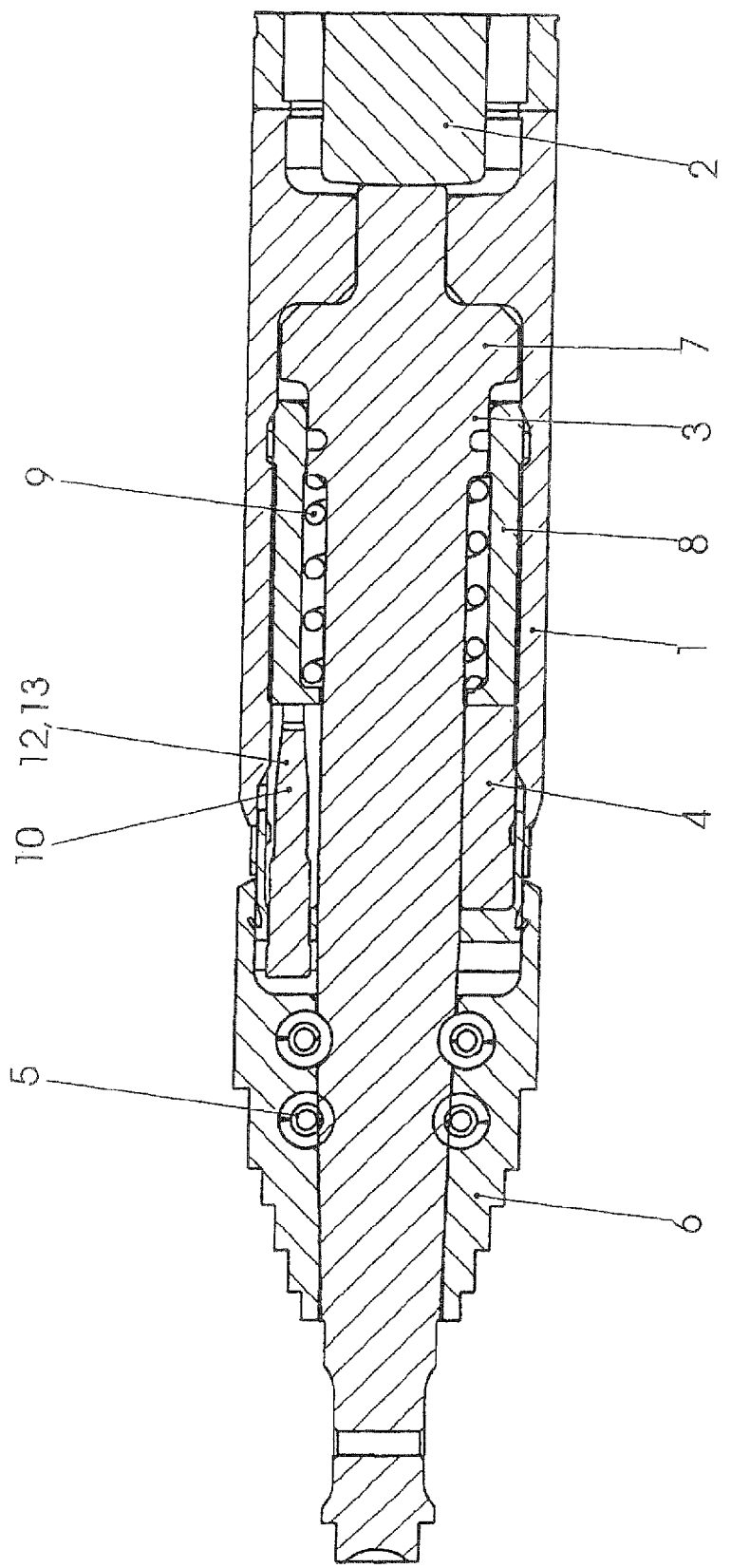
FIG. 1 a sectional side view of an earth boring device according to the invention with threaded element and locking bolt, FIG. 2 an isometric view of the threaded element of FIG. 1, FIG. 3 an isometric view of the securing element (locking bolt) of FIG. 1, FIG. 4 a sectional side view of an alternate embodiment of a threaded element, FIG. 5 a sectional side view of a third embodiment of a threaded element, and FIG. 6 a perspective view of the threaded element of FIG. 5.

FIG. 1 depicts a sectional side view of the leading part of an earth boring device according to the invention, including a housing 1 in which a percussion piston 2 is operated in an oscillating manner under the influence of compressed air and thereby impacts periodically an impact surface of a percussion bolt 3 which is movably connected with the housing 1 through intervention of a threaded ring 4. The threaded connection between the threaded ring 4 and the housing 1 is secured by means of a locking bolt 10.

The percussion bolt 3 extends through the threaded ring 4 beyond the housing 1 and is connected there via pins 5 with a stepped drill head 6.

Impact of the percussion piston 2 upon the impact surface of the percussion bolt 3 causes the percussion bolt 3 and the attached drill head 6 to move in relation to the housing 1 so that the drill head 6 pushes aside the soil surrounding the boring device to establish a borehole absent any initial movement of the housing 1. Only after a defined movement of the percussion bolt 3 in relation to the housing 1 is a shoulder 7 of the percussion bolt 3 able to strike against a sleeve 8 which transmits the impact energy again onto the threaded ring 4 which is screwed onto the housing 1. In this way, the housing 1 of the boring apparatus tracks the already advancing drill head 6.

A spring 9 disposed within the sleeve 8 causes the drill head 6 to return to the retracted position after each stroke.

Figure 2:
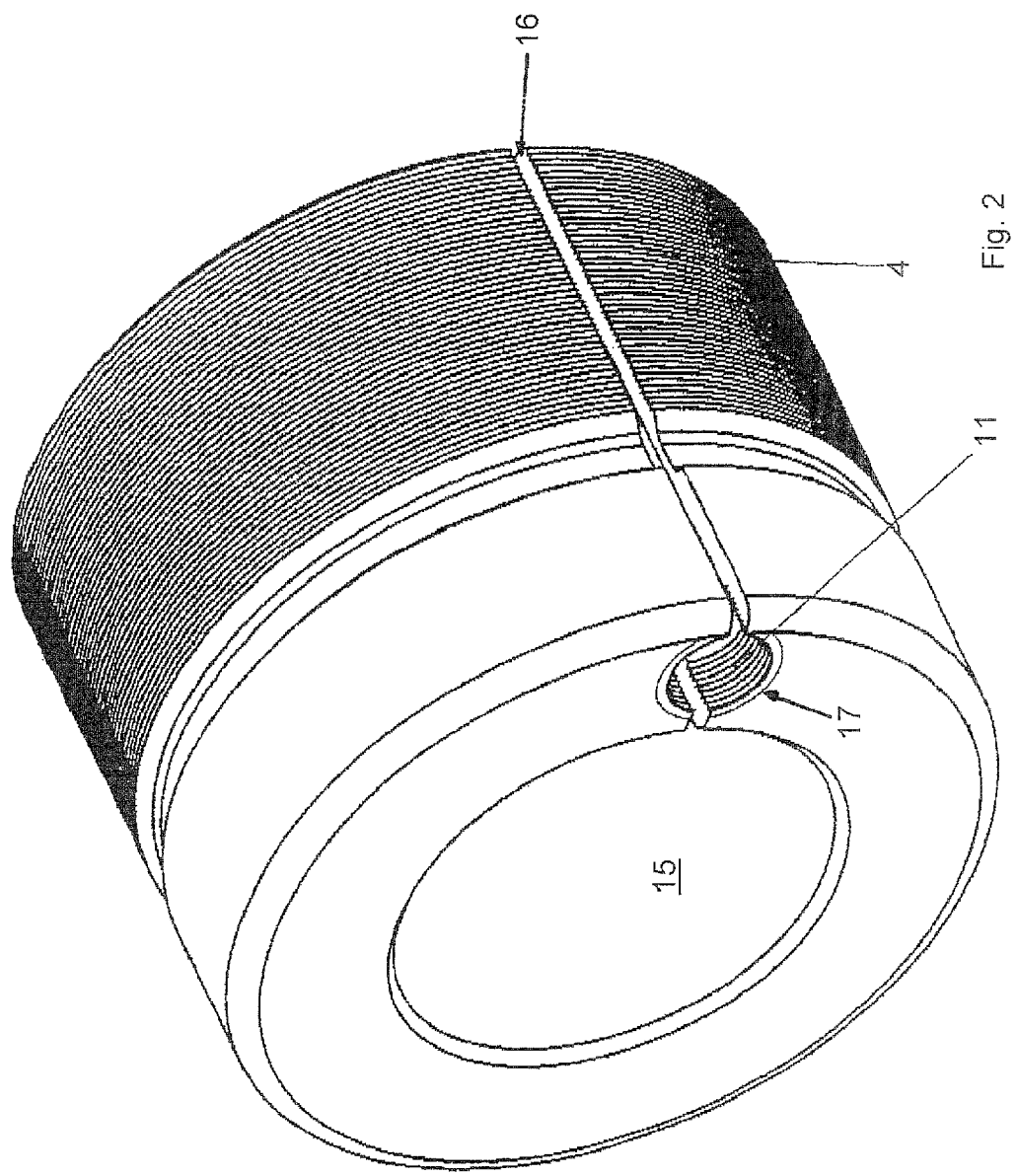
Figure 3:
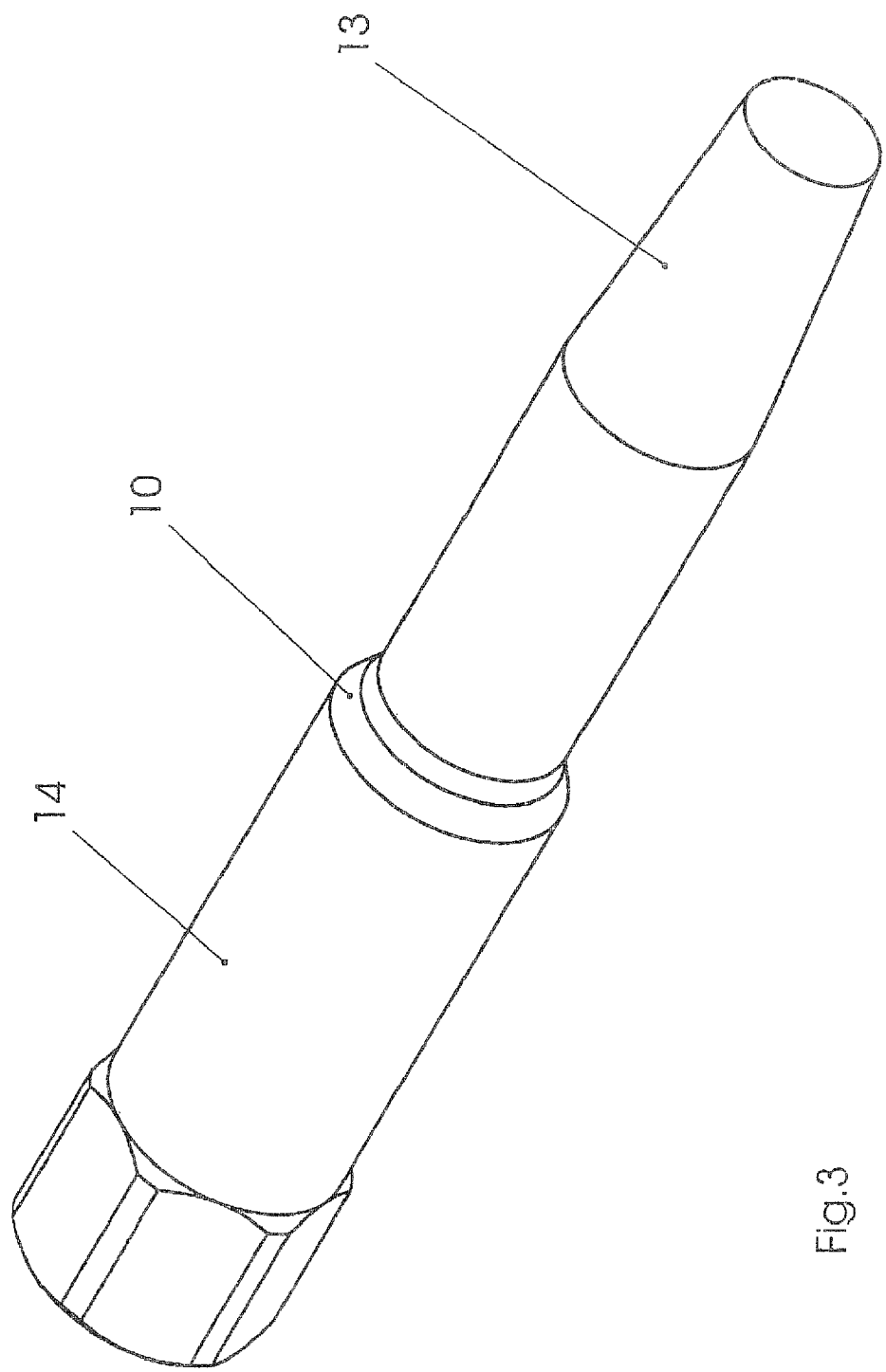

As shown in FIG. 2, the threaded ring 4 has an inner bore 15 and a longitudinal slot 16 in which a receptacle 17 is integrated for the locking bolt 10. One portion of the receptacle 17 is provided with a thread 11 for threaded engagement of the locking bolt 10 which has a complementary portion with an outer thread 14 (cf. FIG. 3).

In addition, the receptacle in the threaded ring 4 as well as the locking bolt 10 have corresponding conical portions 12, 13. As the locking bolt 10 is screwed into the receptacle, the longitudinal slot of the threaded ring 4 is expanded by the relative movement of the two conical portions so that the contact pressure of the threaded connection between the threaded ring 4 and the housing 1 is increased at the same time.

Figure 4:
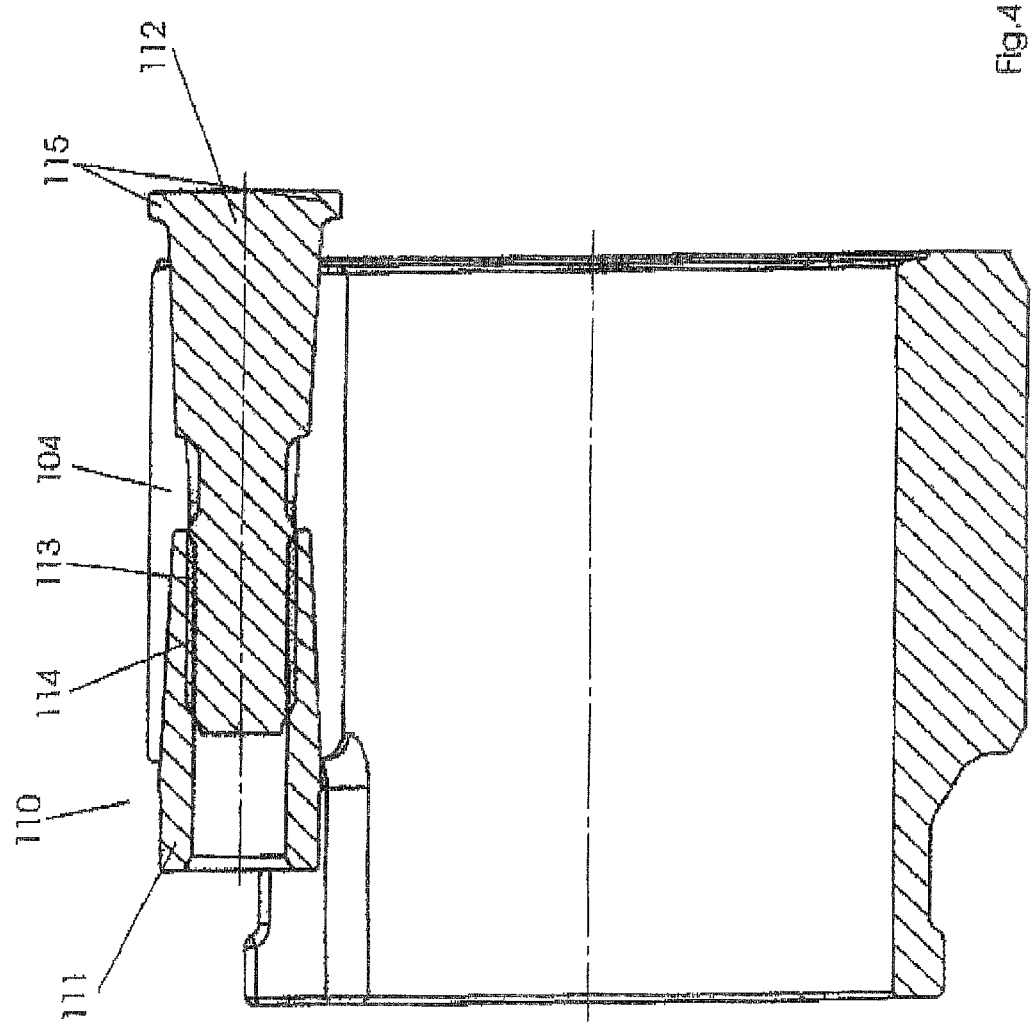

The alternate embodiment illustrated in FIG. 4 shows a securing element 110 made of several parts. The securing element has a sleeve 111, which is placed in the receptacle of the threaded element 104, and a bolt 112. The bolt 112 is inserted in part in the sleeve 111. The receptacle traverses the threaded element 104 and has an opening on one side of the threaded element and an opening on an opposite side of the threaded element. The sleeve 111 is inserted from one side in the receptacle and the bolt 112 is inserted from the other side in the receptacle, with an outer tread 113 of the bolt 112 engaging an inner thread 114 of the sleeve 111. The bolt 112 has a protrusion 115 as constraint against rotation. The protrusion 115 may engage in a corresponding recess of the threaded element 104.

The bolt 112 as well as the sleeve 111 have a conical configuration such that the respective cone tapers in the opposite direction.

Figure 5:
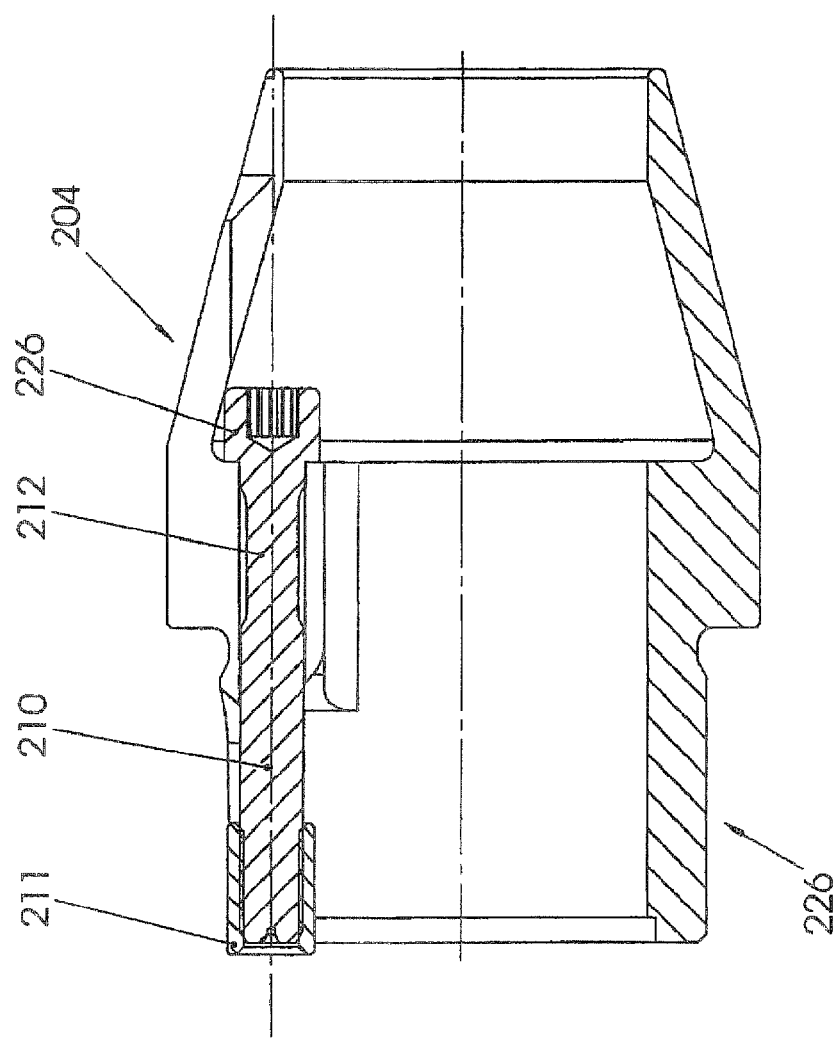
Figure 6:
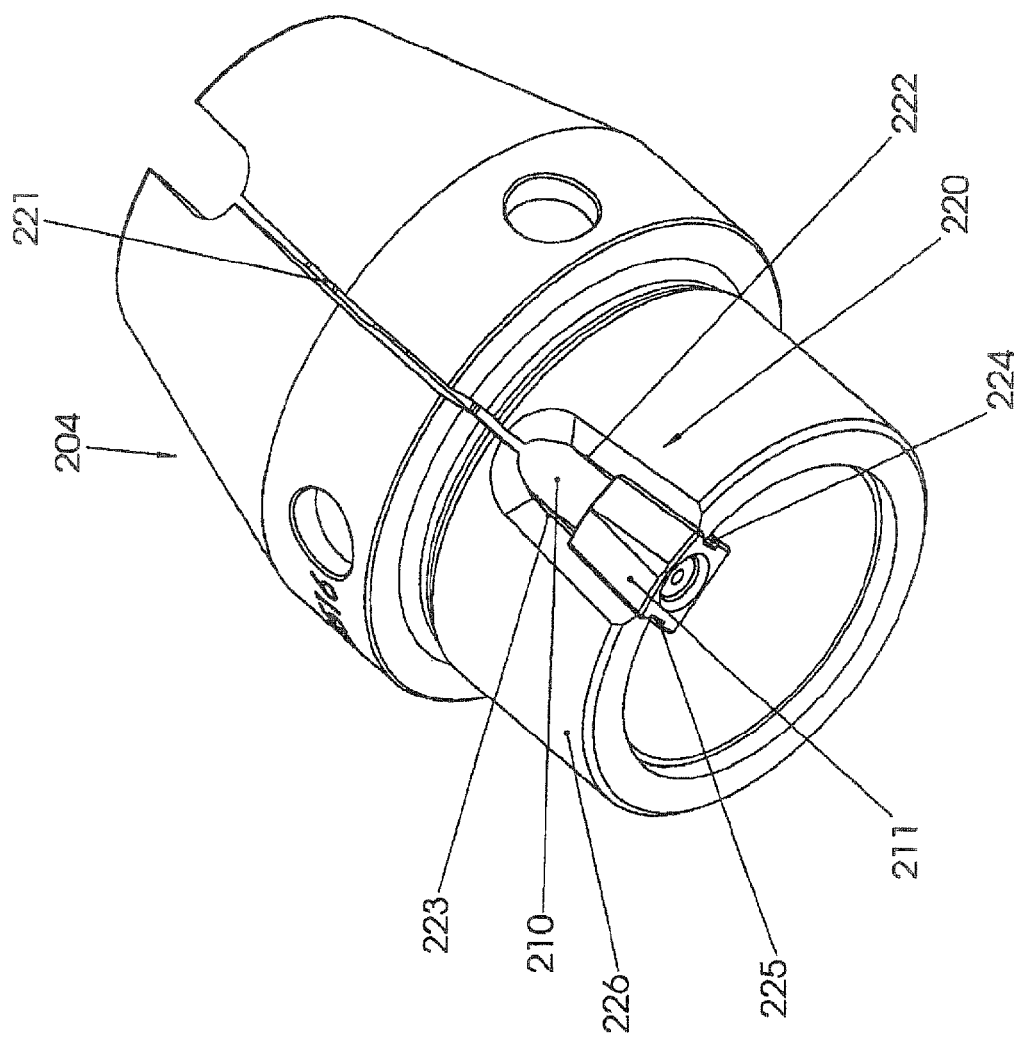

The third embodiment depicted in FIGS. 5, 6 shows a multipart securing element 210. The securing element 210 has a block-like sleeve 211 which is inserted in a guide portion 220 of the receptacle of the threaded element 204, and a bolt 212. The bolt 212 has an outer thread for engagement in an inner thread of the sleeve 211. The threaded element 204 is traversed by a gap 221 in length direction as well as in radial direction of the threaded element 204. The gap 221 also extends through the receptacle.

The threaded element 204 has an outer thread 226 with which it can be screwed into an unillustrated housing.

The guide portion 220 of the receptacle has two guide surfaces 222 and 223 for guiding the sleeve 211 for movement along these guide surfaces 222, 223. The guide surfaces 222, 223 converge in movement direction of the sleeve 211. This is the movement direction in which the sleeve 211 has to be moved to expand the threaded element 204.

Except for the contact with the guide surfaces 222, 223 and the engagement with the bolt 212, the sleeve 211 is free of any contact with other elements. The portions of the receptacle, which form the guide surfaces 222, 223, engage the grooves 224, 225 of the sleeve 211.

The threaded element 204 has a trailing portion having an interior which is provided with an abutment for support of a head 226 of the bolt 212. This abutment is configured preferably conically (not shown) to interact with the conically designed head (not shown) and to apply a spreading effect on the threaded element 204. The threaded element has adjacent to the abutment a sleeve-like portion which is traversed by the part of the bolt 212 adjacent to the head 226.

What is claimed is:

1. A threaded element for connection with a housing of an earth boring device, comprising a body having an inner bore and a slot, said slot extending inwardly from a perimeter of the body and terminating in the inner bore of the body, and a receptacle integrated in the slot for insertion of a locking bolt, wherein the body has an outer diameter which undergoes an enlargement, as the locking bolt is inserted in the receptacle, said body having an outer thread for threaded connection with the housing.

2. The threaded element of claim 1, wherein the body has a ring-shaped configuration.

3. The threaded element of claim 1, wherein the receptacle is arranged off-center.

* * * * *